(12) United States Patent
Grawrock

(10) Patent No.: US 7,117,376 B2
(45) Date of Patent: Oct. 3, 2006

(54) PLATFORM AND METHOD OF CREATING A SECURE BOOT THAT ENFORCES PROPER USER AUTHENTICATION AND ENFORCES HARDWARE CONFIGURATIONS

(75) Inventor: David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 410 days.

(21) Appl. No.: 09/751,899

(22) Filed: Dec. 27, 2000

(65) Prior Publication Data

US 2002/0087877 A1    Jul. 4, 2002

(51) Int. Cl.
G06F 9/44    (2006.01)
H04K 1/00    (2006.01)

(52) U.S. Cl. ...................................... 713/200; 380/277
(58) Field of Classification Search ................ 713/164, 713/200, 201, 165, 2, 186, 182, 166, 185; 715/64, 80, 54; 380/277
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | 711/166 |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen | |
| 4,521,852 A | 6/1985 | Guttag | |
| 4,571,672 A | 2/1986 | Hatada et al. | |
| 4,759,064 A | 7/1988 | Chaum | |
| 4,795,893 A | 1/1989 | Ugon | |
| 4,802,084 A | 1/1989 | Ikegaya et al. | |
| 4,825,052 A | 4/1989 | Chemin et al. | |

(Continued)

FOREIGN PATENT DOCUMENTS

DE    4217444    12/1992

(Continued)

OTHER PUBLICATIONS

Berg, Cliff, "How Do I Create a Signed Applet?", *Dr. Dobb's Journal*, (Aug. 1997), 1-9.

(Continued)

*Primary Examiner*—Jeffrey Gaffin
*Assistant Examiner*—Hassan Mahmoudi
(74) *Attorney, Agent, or Firm*—Blakely, Sokoloff, Taylor & Zafman LLP

(57) ABSTRACT

In general, a method of securely transmitting data features an operation of authenticating a user of a platform during a Basic Input/Output System (BIOS) boot process. In response to authenticating the user, a first keying material is released from a token communicatively coupled to the platform. The first keying material is combined with a second keying material internally stored within the platform in order to produce a combination key. This combination key is used to decrypt a second BIOS area to recover a second segment of BIOS code.

16 Claims, 5 Drawing Sheets

U.S. PATENT DOCUMENTS

| | | |
|---|---|---|
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 4,975,950 A | 12/1990 | Lentz |
| 5,007,082 A * | 4/1991 | Cummins .................... 713/164 |
| 5,022,077 A | 6/1991 | Bealkowski et al. |
| 5,050,212 A | 9/1991 | Dyson |
| 5,075,842 A | 12/1991 | Lai |
| 5,079,737 A | 1/1992 | Hackbarth .................. 711/164 |
| 5,121,345 A | 6/1992 | Lentz |
| 5,144,659 A | 9/1992 | Jones |
| 5,187,802 A | 2/1993 | Inoue et al. |
| 5,210,875 A | 5/1993 | Bealkowski et al. |
| 5,224,160 A | 6/1993 | Paulini et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,381 A | 3/1994 | Choy |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,509,120 A | 4/1996 | Merkin et al. |
| 5,511,184 A | 4/1996 | Lin |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubals |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,590,287 A | 12/1996 | Zeller et al. |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,630,106 A | 5/1997 | Ishibashi |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. ...... 711/163 |
| 5,740,178 A | 4/1998 | Jacks et al. |
| 5,752,046 A | 5/1998 | Oprescu et al. |
| 5,757,919 A | 5/1998 | Herbert et al. |
| 5,764,950 A | 6/1998 | Ishizaki |
| 5,764,969 A | 6/1998 | Kahle |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,901,294 A | 5/1999 | Tran et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,953,419 A * | 9/1999 | Lohstroh et al. ............ 713/165 |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A * | 5/2000 | Angelo et al. ............... 713/200 |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 * | 4/2001 | Reardon ..................... 713/165 |
| 6,222,923 B1 | 4/2001 | Schwenk |
| 6,249,872 B1 | 6/2001 | Wildgrube et al. ......... 713/200 |
| 6,252,650 B1 | 6/2001 | Nakaumra |
| 6,269,392 B1 | 7/2001 | Cotichini et al. |
| 6,272,533 B1 | 8/2001 | Browne ..................... 709/213 |
| 6,272,637 B1 | 8/2001 | Little et al. ................ 713/194 |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery et al. |
| 6,314,409 B1 | 11/2001 | Schneck et al. |

| | | | |
|---|---|---|---|
| 6,321,314 B1 | 11/2001 | Van Dyke | |
| 6,327,652 B1 | 12/2001 | England et al. | |
| 6,330,670 B1 * | 12/2001 | England et al. | 713/2 |
| 6,339,815 B1 | 1/2002 | Feng | |
| 6,339,816 B1 | 1/2002 | Bausch | |
| 6,357,004 B1 | 3/2002 | Davis | |
| 6,363,485 B1 * | 3/2002 | Adams et al. | 713/186 |
| 6,374,286 B1 | 4/2002 | Gee et al. | |
| 6,374,317 B1 | 4/2002 | Ajanovic et al. | 710/105 |
| 6,378,068 B1 | 4/2002 | Foster | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,412,035 B1 | 6/2002 | Webber | |
| 6,421,702 B1 | 7/2002 | Gulick | |
| 6,425,084 B1 * | 7/2002 | Rallis et al. | 713/185 |
| 6,435,416 B1 | 8/2002 | Slassi | |
| 6,445,797 B1 | 9/2002 | McGough et al. | |
| 6,463,535 B1 | 10/2002 | Drews et al. | |
| 6,463,537 B1 * | 10/2002 | Tello | 713/182 |
| 6,499,123 B1 | 12/2002 | McFarlane et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B1 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 2001/0021969 A1 | 9/2001 | Burger et al. | |
| 2001/0027527 A1 | 10/2001 | Khidekel et al. | |
| 2001/0037450 A1 | 11/2001 | Metlitski et al. | |
| 2003/0018892 A1 * | 1/2003 | Tello | 713/164 |

FOREIGN PATENT DOCUMENTS

| | | |
|---|---|---|
| EP | 0473913 | 3/1992 |
| EP | 0600112 | 6/1994 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 | 10/2001 |
| GB | 2121569 A | 12/1983 |
| JP | 2000076139 | 3/2000 |
| WO | WO9524696 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO9905600 | 2/1999 |
| WO | WO9918511 | 4/1999 |
| WO | WO9957863 | 11/1999 |
| WO | WO99/65579 | 12/1999 |
| WO | WO0021238 | 4/2000 |
| WO | WO0062232 | 10/2000 |
| WO | WO0127723 | 4/2001 |
| WO | WO0127821 | 4/2001 |
| WO | WO0163994 | 8/2001 |
| WO | WO0175565 | 10/2001 |
| WO | WO0175595 | 10/2001 |
| WO | WO0201794 | 1/2002 |
| WO | WO9909482 | 1/2002 |
| WO | WO0217555 | 2/2002 |
| WO | WO02060121 | 8/2002 |
| WO | WO0175564 | 10/2002 |
| WO | WO02086684 | 10/2002 |
| WO | WO03058412 | 7/2003 |

OTHER PUBLICATIONS

Brands, Stefan , "Restrictive Blinding of Secret-Key Certificates", *Springer-Verlag XP002201306*, (1995), Chapter 3.

Chen, Andrew A., et al., "Safe and Protected Execution for the Morph/AMRM Reconfigurable Processor", *7th Annual IEEE Symposium, FCCM '99 Proceedings, XP010359180*, ISBN 0-7695-0375-6, Los Alamitos, CA, (Apr. 21, 1999),209-221.

Compaq Computer Corporation, et al., "Trusted Computing Platform Alliance (TCPA) Main Specification Version 1.1a", (Dec. 2001), 1-321.

Davida, George I., et al., "Defending Systems Against Viruses through Cryptographic Authentication", *Proceedings of the Symposium on Security and Privacy*, IEEE Comp. Sec. Press, ISBN 0-8186-1939-2, (May 1989).

Goldberg, Robert P., "Survey of Virtual Machine Research", *Computer Magazine*, (Jun. 1974), cover, contents, 34-35.

Gong, Li , et al., "Going Behond the Sandbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983),530-544.

Heinrich, Joe , "MIPS R4000 Microprocessor User's Manual, Second Edition", Chapter 4 "Memory Management", (Jun. 11, 1993),61-97.

IBM, "Information Display Technique for a Terminiate Stay Resident Program IBM Technical Disclosure Bulletin", *TDB-ACC-No. NA9112156*, vol. 34, Issue 7A, (Dec. 1, 1991),156-158.

Intel, "Intel386 DX Microprocessor 32-Bit CHMOS Microprocessor With Integrated Memory Management", (1995), 1-56.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Lawton, Kevin , et al., "Running Multiple Operating Systems Concurrently on an IA32 PC Using Virtualization Techniques", http://www.plex86.org/research/paper.txt, (Nov. 29, 1999),1-31.

Luke, Jahn , et al., "Replacement Strategy for Aging Avionics Computers", *IEEE AES Systems Magazine*, XP002190614,(Mar. 1999).

Menezes, Oorschot , "Handbook of Applied Cryptography", *CRC Press LLC*, USA XP002201307, (1997),475.

Motorola, "M68040 User's Manual", (1993), cover, vi-xxiii, 1-1 to 8-32.

Richt, Stefan , et al., "In-Circuit-Emulator Wird Echtzeittauglich", *Elektronic Franzis Verlag GMBH*, Munchen, DE, vol. 40, No. 16, XP000259620,(100-103),Aug. 6, 1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000), 1-17.

Rosenblum, M. , "Virtual Platform: A Virtual Machine Monitor for Commodity PC", *Proceedings of the 11th Hotchips Conference*, (Aug. 17, 1999), 185-196.

Saez, Sergio , et al., "A Hardware Scheduler for Complex Real-Time Systems", *Proceedings of the IEEE International Symposium on Industrial Electronics*, XP002190615,(Jul. 1999),43-48.

Sherwood, Timothy , et al., "Patchable Instruction ROM Architecture", *Department of Computer Science and Engineering*, University of California, San Diego, La Jolla, CA, (Nov. 2001), 24-33.

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICCD '86)*, (Oct. 6, 1986), 155-160.

Fabry, R.S., "Capability-Based Addressing", Fabry, R.S., *"Capability-Based Addressing," Communications of the ACM*, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture*, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code C", *Wiley, John & Sons, Inc.*, XP0021111449; ISBN 0471117099,(Oct. 1995),169-187.

Schneier, Bruce, "Applied Cryptography: Protocols, Algorithms, and Source Code in C", *2nd Edition; Wiley, John & Sons, Inc.*, XP002251738; ISBN 0471128457,(Nov. 1995),28-33; 176-177; 216-217; 461-473; 518-522.

Bennett Yee, "Using Secure Coprocessors," May 1994 CMU-CS-94-149, School of Computer Science, Carnegie Mellon University, Pittsburgh, PA 15213.

J.D. Tygar et al., "Strongbox: A System for Self-Securing Programs," ACM Press and Addison-Wesley, 1991, pp. 163-197, In Carnegie Mellon Computer Science.

Robert R. Jueneman, "Integrity Controls for Military and Commercial Applications," 1988 IEEE, Computer Sciences Corporation.

George I. Davida et al., "Defending Systems Against Viruses through Cryptographic Authentication," 1989, University of Wisconsin-Milwaukee, WI.

Butler Lampson, et al., "Authentication in Distributed Systems: Theory and Practice," Digital Equipment Corporation.

Fred Cohen, "A Cryptographic Checksum for Integrity Protection," Dec. 1987, Computers anbd Security vol. 6, Issue 6, pp. 505-510.

Morrie Gasser, et al., "The Digital Distributed System Security Architecture," 1989 National Computer Security Conference, Digital Equipment Corp., Boxborough, MA.

Department of Defense, Orange Book - Full Text, "Department of Defense Trusted Computer System Evaluation Criteria" Dec. 1985.

* cited by examiner

PLATFORM AND METHOD OF CREATING A SECURE BOOT THAT ENFORCES PROPER USER AUTHENTICATION AND ENFORCES HARDWARE CONFIGURATIONS

BACKGROUND

1. Field

This invention relates to the field of data security. In particular, the invention relates to a platform and method for protecting information through a secure boot using user authentication and/or hardware configurations.

2. Background

Personal computers (PCs) typically include different types of storage components to store programs and data. These storage components include random access memory (RAM), read-only memory (ROM), and memory devices that are located external to the PC (e.g., hard disk or a floppy disk). To load an operating system on a PC, it is necessary to initialize or "boot" the PC by loading and executing boot code. Because the PC typically is unable to access external devices until after it is booted, the boot code is stored internally within the PC.

Typically, a ROM component is used to store the boot code. This boot code, normally referred to as "boot block," is obtained from the ROM and executed. The boot block is coded to (i) locate Basic Input/Output System (BIOS), (ii) load the BIOS for execution, and (iii) pass control to the BIOS. Thereafter, the BIOS checks Option ROMs, loads the operating system (OS) loader, and passes control to the OS loader.

Currently, enhanced security features are being implemented in platforms with greater regularity. However, current security features lack the combination of both user authentication and secure boot functionality.

BRIEF DESCRIPTION OF THE DRAWINGS

The features and advantages of the present invention will become apparent from the following detailed description of the present invention in which.

DESCRIPTION

Figure 1:
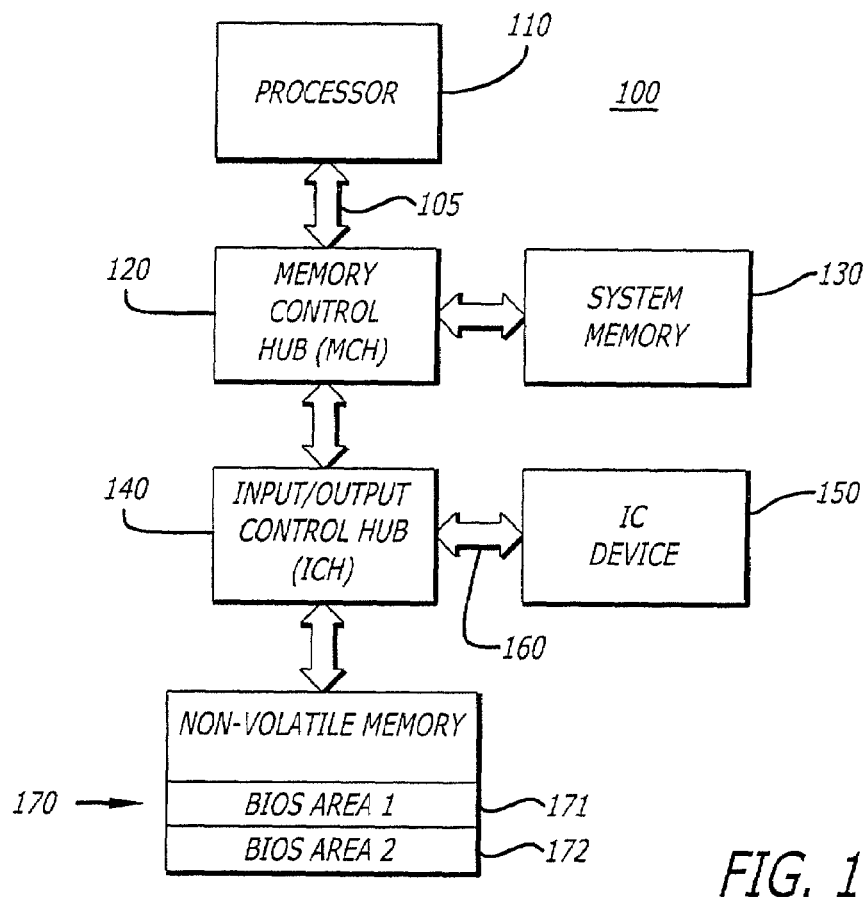
FIG. 1 is an exemplary embodiment of a platform utilizing the present invention.

The present invention relates to a platform and method for protecting information through a secure boot process using user authentication and/or hardware configurations. More specifically, the invention comprises the employment of one or more additional boot operations into a boot process in order to enhance security; namely, (i) the binding of a segment of Basic Input/Output System (BIOS) code to its platform and current configuration (e.g., hardware configuration within the platform) and (ii) the encryption of another segment of the BIOS code using binding operations and contents of a token to recover keying material.

Herein, certain details are set forth in order to provide a thorough understanding of the present invention. It is apparent to a person of ordinary skill in the art, however, that the present invention may be practiced through many embodiments other that those illustrated. Well-known circuits are not set forth in detail in order to avoid unnecessarily obscuring the present invention.

In the following description, certain terminology is used to discuss features of the present invention. For example, a "platform" includes any product that performs operations for subsequent analysis and verification of the platform's boot process. Examples of a platform include, but are not limited or restricted to a computer (e.g., desktop, a laptop, a server, a workstation, a personal digital assistant, etc.) or any peripherals associated therewith; communication equipment (e.g., telephone handset, pager, etc.); a television set-top box and the like. A "link" is broadly defined as a logical or physical communication path such as, for instance, electrical wire, optical fiber, cable, bus trace, or even a wireless channel using infrared, radio frequency (RF), or any other wireless signaling mechanism.

In addition, the term "information" is defined as one or more bits of data, address, and/or control. "Code" includes software or firmware that, when executed, performs certain functions. Examples of code include an application, an applet, or any other series of instructions. "Keying material" includes a cryptographic key or information used to produce a cryptographic key.

A "cryptographic operation" is an operation performed to enhance data security through obfuscation, integrity protection and the like. For example, one type of cryptographic operation is hashing, namely a one-way conversion of information to a fixed-length representation that is referred to as a hash value. Normally, the "hash value" is substantially lesser in size than the original information. It is contemplated that, in some cases, the hashing may involve a 1:1 conversion. One type of hashing function is referred to as The Secure Hash Algorithm (SHA-1) as specified by The National Institute of Standards of Technology.

A "binding" operation is the act of performing operations, within a device, to obfuscate information and subsequently recover the information using a secret value stored inside the device and/or a token of that device. In one embodiment, the binding operation involves a combination of encryption and non-volatile storage that creates encrypted information that can only be decrypted using the secret value. Herein, a "token" is any type of device that can securely store information. As an optional characteristic, the token may be removable from the platform. Illustrative examples of the token include, but are not limited or restricted to a smart card, a PCMCIA card, a Bluetooth(tm) device, a Universal Serial Bus (USB) token, and the like.

When the binding operation is performed during a boot process, the secret value is never revealed outside the device. In one situation, the secret value may be a cryptographic key. For another situation, however, the secret value may be computed integrity metrics for the platform. An "integrity metric" is a cryptographic hash value of information such as the BIOS, option ROM (e.g., BOIS extension) or another type of information. One configuration of an integrity metric, referred to as the "hardware metric," can be stored within one or more internal registers and represent the configuration of one or more hardware devices of the platform.

Referring to FIG. 1, an exemplary block diagram of an illustrative embodiment of a platform 100 employing the present invention is shown. The platform 100 comprises a processor 110, a memory control hub (MCH) 120, a system memory 130, an input/output control hub (ICH) 140, and an integrated circuit (IC) device 150 which initiates, monitors and controls the boot process of the platform 100.

As shown in FIG. 1, the processor 110 represents a central processing unit of any type of architecture, such as complex instruction set computers (CISC), reduced instruction set computers (RISC), very long instruction word (VLIW), or a hybrid architecture. In one embodiment, the processor 110 is compatible with the INTEL(r) Architecture (IA) processor, such as the IA-32 and the IA-64. Of course, in an alternative embodiment, the processor 110 may include multiple processing units coupled together over a common host bus 105.

Coupled to the processor 110 via the host bus 105, the MCH 120 may be integrated into a chipset that provides control and configuration of memory and input/output (I/O) devices such as the system memory 130 and the ICH 140. The system memory 130 stores system code and data. The system memory 130 is typically implemented with dynamic random access memory (DRAM) or static random access memory (SRAM).

The ICH 140 may also be integrated into a chipset together or separate from the MCH 120 to perform I/O functions. As shown, the ICH 140 supports communications with the IC device 150 via link 160. Also, the ICH 140 supports communications with components coupled to other links such as a Peripheral Component Interconnect (PCI) bus at any selected frequency (e.g., 66 megahertz "MHz", 100 MHz, etc.), an Industry Standard Architecture (ISA) bus, a Universal Serial Bus (USB), a Firmware Hub bus, or any other bus configured with a different architecture than those briefly mentioned. For example, the ICH 140 may be coupled to non-volatile memory 170 (e.g., flash memory) to contain BIOS code.

The non-volatile memory 170 includes BIOS code, portions of which have undergone a binding operation. For instance, a first BIOS area (BIOS Area 1) 171 is a first segment of the BIOS code that has undergone a binding operation. This binding operation ensures that the first BIOS segment cannot be executed on any other platform besides platform 100 and that the platform 100 employs certain hardware that was in place during the binding operation. A second BIOS area (BIOS Area 2) 172 is another (second) segment of the BIOS code that has undergone a binding operation. This binding operation ensures that (i) a selected user has authorized use of platform 100, and (ii) user authorization has occurred on the same platform and within the same hardware and BIOS configuration as described in FIG. 5.

Of course, it is contemplated that the IC device 150 may be employed in a different embodiment than described above. For example, although not shown, the functionality of the IC device 150 may be employed within the ICH 140. Thus, any packaging associated with the ICH 140 would protect the IC device from damage caused by contaminants or unauthorized probing.

Figure 2:
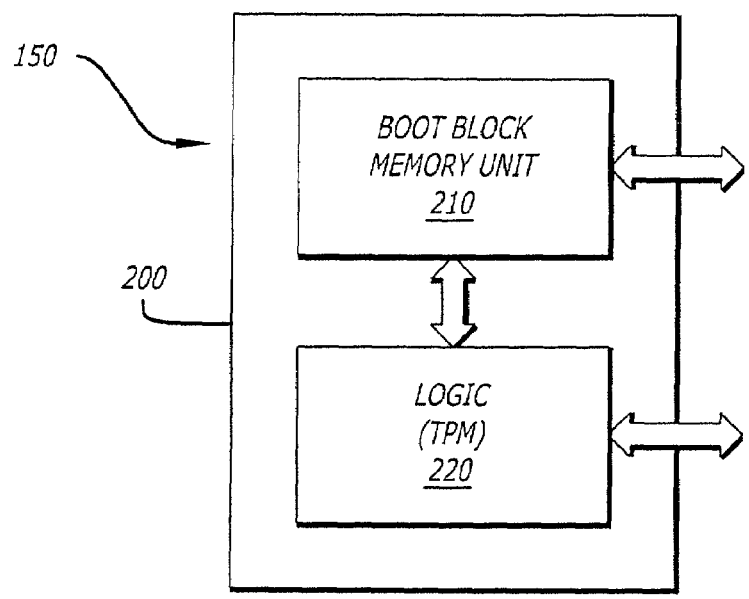
FIG. 2 is an exemplary embodiment of the IC device configured as a Trusted Platform Module (TPM) employed within the platform of FIG. 1.

Referring to FIG. 2, an exemplary embodiment of the IC device 150 is shown. The IC device 150 comprises one or more integrated circuits placed within a protective package 200 such as any type of integrated circuit package, a cartridge covering a removable daughter card featuring an integrated circuit(s) and the like. For this embodiment, the IC device 150 comprises a boot block memory unit 210 in communication with logic 220 that performs various binding and cryptographic operations. For instance, the logic 220 may be implemented as a trusted platform module (TPM) as described in FIG. 3.

Figure 3:
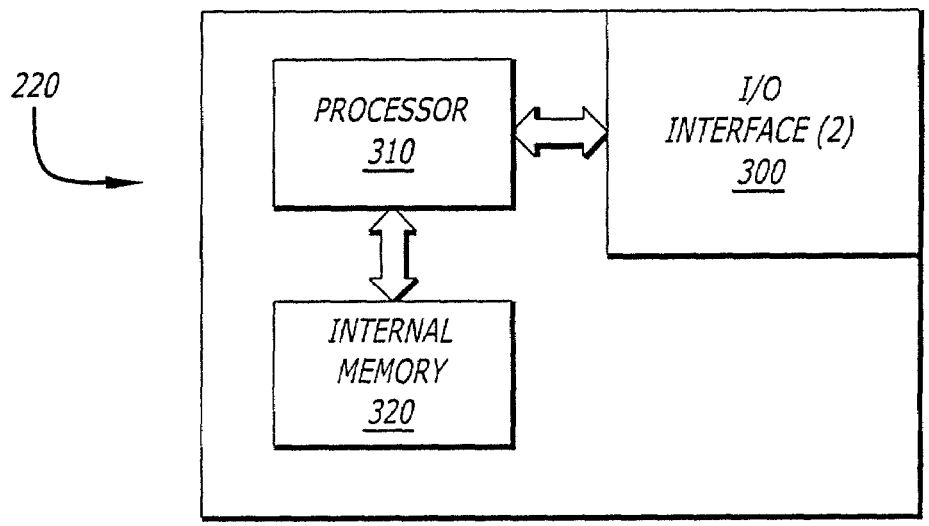
FIG. 3 is an exemplary embodiment of the TPM of FIG. 2.
Figure 4A:
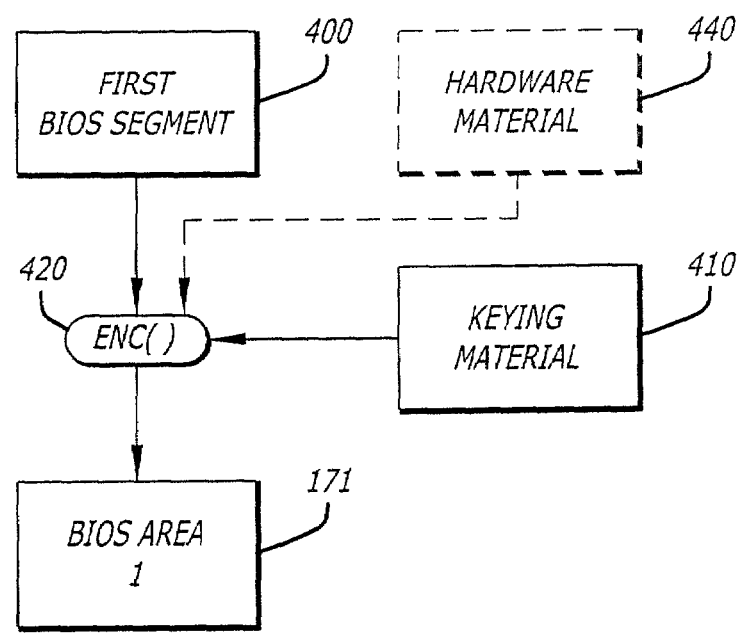
FIGS. 4A–4B are exemplary embodiments of binding operations performed by the TPM of FIG. 3.
Figure 4B:
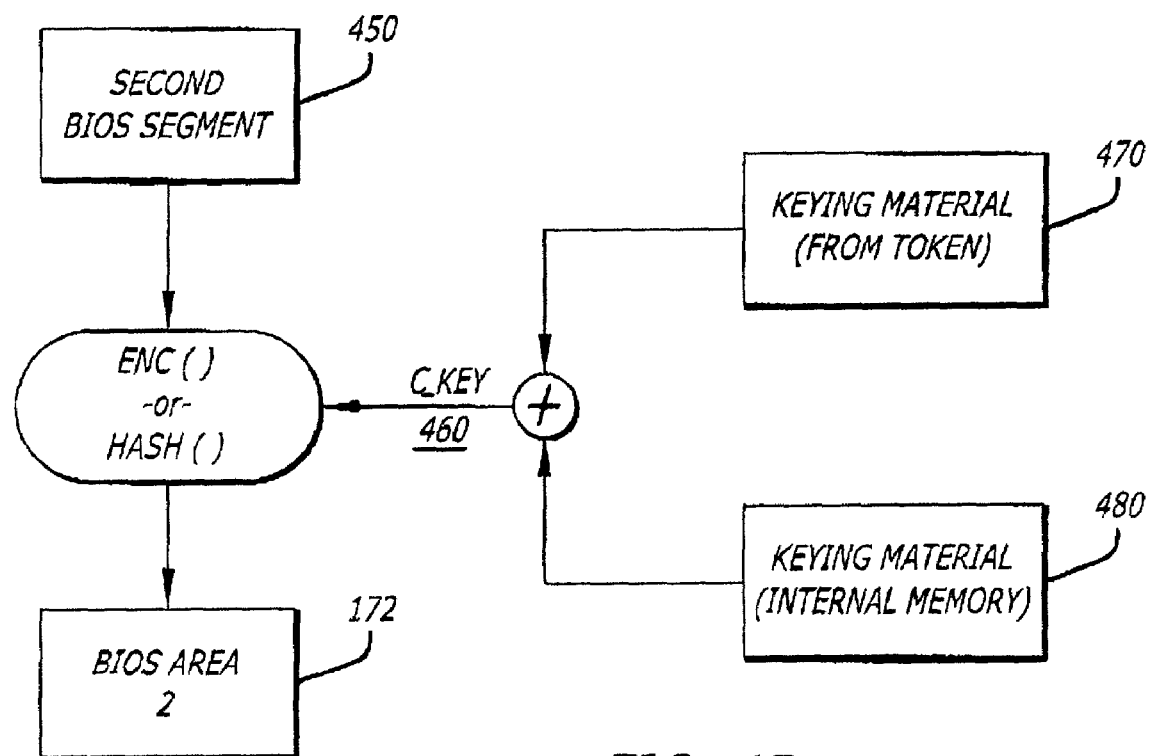

Referring now to FIG. 3, an exemplary embodiment of a TPM is shown. The TPM comprises at least an I/O interface 300, a processor 310, and internal memory 320 (e.g., volatile and/or non-volatile). Herein, the processor 310 is configured to access certain content within the internal memory 320 (e.g., software, keying material, etc.) to perform cryptographic operations on incoming information. One of these cryptographic operations includes a binding operation as shown in FIGS. 4A–4B. Of course, in lieu of the processor 310 performing the cryptographic operations, it is contemplated that a cryptographic unit separate from the processor 310 may be employed.

For instance, as shown in FIG. 4A, the first BIOS segment 400 undergoes a binding operation by encrypting this selected segment of the BIOS code using keying material 410 securely stored in the internal memory of the TPM. This binding operation is performed in a controlled environment such as by an original equipment manufacturer or by an entity authorized by a manufacturer of the TPM or platform (e.g., an authorized retailer or distributor, an information technology "IT" department of a business, etc.)

In addition, this binding operation could further utilize an integrity metric (e.g., a hardware metric) as an additional binding parameter 440 as shown by dashed lines. The hardware metric may be a hash value of identification (ID) information for certain hardware employed within the platform. The "ID information" may be a pre-stored serial number, a hash value of a serial number or some other type of static information such as driver code from an IDE controller, a Network Interface Card (NIC) address and the like. This provides an additional check that the platform 100 has the same hardware as when the first BIOS segment 400 was "bound" to the platform.

In addition, as shown in FIG. 4B, another (second) segment of the BIOS code 450 undergoes a binding operation by encrypting that segment using a key 460 formed by a combination of both (1) keying material 470 provided by a token associated with the platform and (2) keying material 480 stored within internal memory of the TPM (referred to as the "combination key" or "C_Key").

Figure 5:
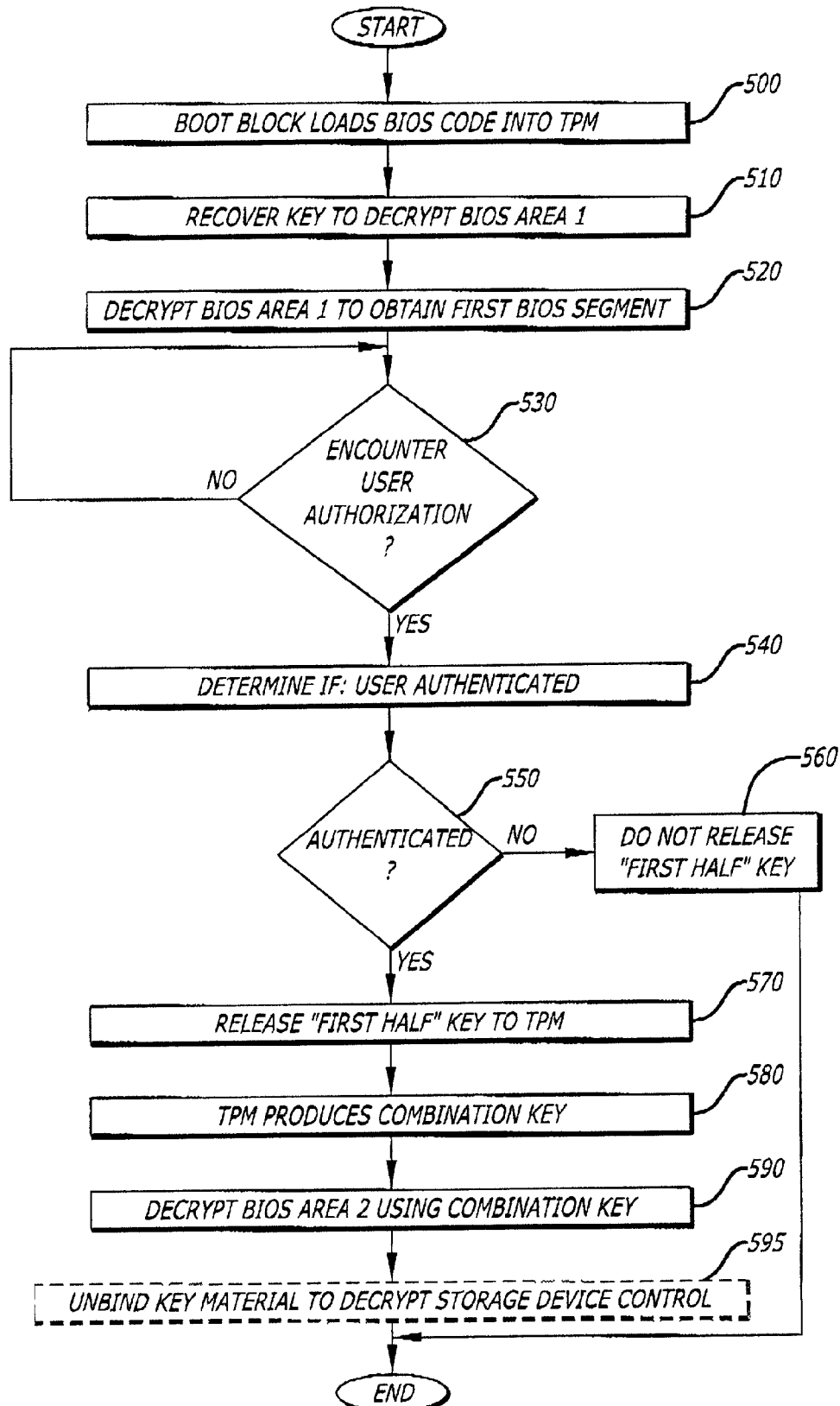
FIG. 5 is an exemplary embodiment of a flowchart illustrating the operations during initialization of the platform of FIG. 1.
Figure 6:
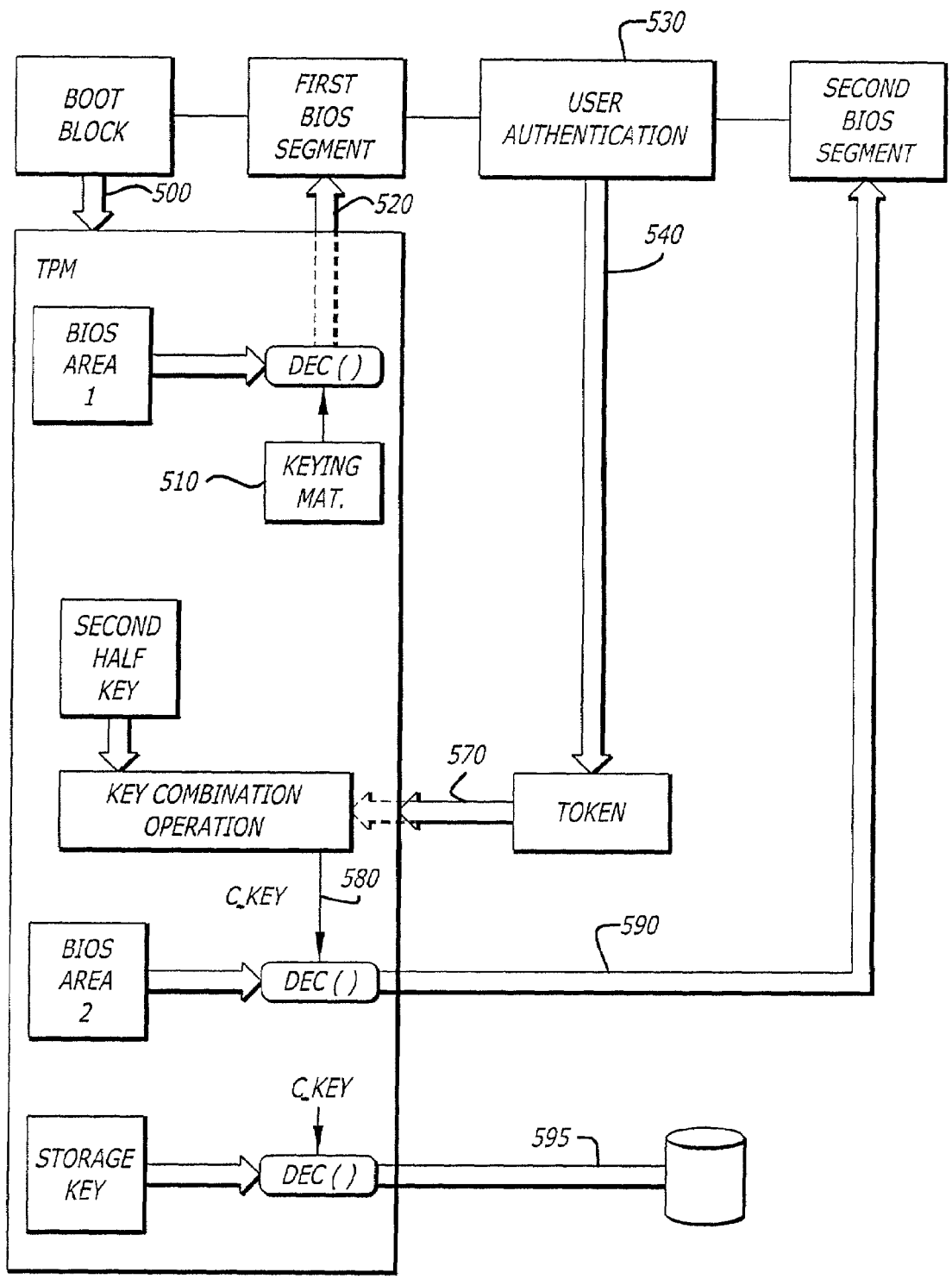
FIG. 6 is an exemplary embodiment of a block diagram illustrating the operations during initialization of the platform as shown in FIG. 5.

Referring to FIGS. 5 and 6, a flowchart and corresponding block diagram illustrate the operations during initialization of the platform of FIG. 1. It is contemplated that the binding of the first BIOS segment is performed to ensure that the platform and its hardware configuration have not been modified. The binding of the second BIOS segment is to ensure that the user has authorized use of the platform and that the platform is still implemented with the same hardware and BIOS configurations.

Initially, as shown in item 500, the boot block loads the BIOS code into the TPM. The BIOS code includes at least BIOS Area 1 and BIOS Area 2. The amount of BIOS code associated with the first BIOS segment (BIOS Area 1) needs to be sufficient to enable communications with the TPM and that the TPM is able to perform an unbinding operation. For instance, the first BIOS segment may include a section of the BIOS code that executes immediately after the BIOS gets address ability to the TPM.

Thereafter, as shown in item 510, the TPM recovers keying material for use in recovering the first BIOS segment from BIOS Area 1. Herein, the key is used to decrypt BIOS Area 1 either within the TPM or in the BIOS itself (item 520). "Decryption" is represented through a "DEC( )" label. It is contemplated that if a hardware metric is used as an additional binding parameter, the binding would occur after creation of the hardware metric and would require an additional check that the platform has the same hardware as when the first BIOS segment was bound to the platform. This check may be accomplished, for example, by (i) performing a hashing operation on ID information from selected hardware in order to produce a result and (ii) comparing the result with the hardware metric. Normally, the hardware metric is stored in platform configuration registers within the platform.

Thereafter, the BIOS process continues until a user authentication sub-process is encountered (item 530). Upon encountering the user authentication sub-process, the BIOS determines at least whether the user has been authenticated through an acceptable authentication mechanism as shown in item 540. Acceptable authentication mechanisms include, for example, a password-based mechanism or a biometrics mechanism (e.g., fingerprint scan, retinal scan, hand or face geometry scan, and the like).

If authentication (item 550), the token releases information to the TPM. In this embodiment, the information is keying material (referred to as a "first-half key"). Otherwise, the first-half key is not released by the token, which prevents subsequent recovery of the second BIOS segment through decryption of BIOS Area 2 (item 560).

The first-half key is provided to the TPM, which produces a combination key as shown in items 570 and 580. In this embodiment, the combination key is produced by performing a key combination operation on both the first-half key and keying material stored within the internal memory of the TPM (referred to as "second-half key"). Examples of a "key combination operation" include hashing, a bitwise exclusive OR (XOR), encryption, addition, subtraction, concatenation and the like. Thereafter, the second BIOS segment is recovered using the combination key (e.g., via decryption) as shown in item 590.

Concurrently or subsequent to recovering the second BIOS segment, as an optional operation, the TPM may unbind keying material associated with a non-volatile storage device (e.g., hard disk drive) as shown in item 595. In this embodiment, the keying material is "unbound" by decrypting it with the combination key and perhaps hardware metrics. This enables the user to access content stored on the non-volatile storage device.

It is contemplated that an optional enhancement of the present invention may involve on-the-fly key modification. This may be accomplished by implementing an access control mechanism to prevent unauthorized access to the second-half key stored in platform memory in lieu of storing the second-half key within internal memory of the TPM. The type of access control mechanism that may be implemented includes Isolated Execution (ISOX(tm)) techniques by Intel Corporation of Santa Clara, Calif. This would allow remote reset of the BIOS to a new value without having physical access to the platform.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Additionally, it is possible to implement the present invention or some of its features in hardware, firmware, software or a combination thereof where the software is provided in a processor readable storage medium such as a magnetic, optical, or semiconductor storage medium.

What is claimed is:

1. A method comprising:
   loading a Basic Input/Output System (BIOS) code including a first BIOS area and a second BIOS area, the first BIOS area being a first segment of the BIOS code encrypted with a keying material stored within an internal memory of a trusted platform module of a platform and the second BIOS area being a second segment of the BIOS code encrypted with a combination key;
   loading an integrity metric including a hash value of an identification information of the platform;
   authenticating a user of the platform during a BIOS boot process;
   releasing a first keying material from a token communicatively coupled to the platform after authenticating the user during the BIOS boot process;
   combining the first keying material with a second keying material internally stored within the platform in order to produce a combination key during the BIOS boot process; and
   using the combination key to decrypt a second BIOS area to recover a second segment of BIOS code during the BIOS boot process.

2. The method of claim 1 further comprising:
   continuing the BIOS boot process.

3. The method of claim 1, wherein after loading of the BIOS code, the method further comprises:
   decrypting the first BIOS area to recover the first segment of the BIOS code.

4. The method of claim 1, wherein the first segment of the BIOS is encrypted with the keying material and static information pertaining to the platform, the static information including the integrity metric.

5. The method of claim 4, wherein the static information is a serial number or a hash value of the serial number associated with hardware within the platform.

6. The method of claim 1 wherein the combination key is a value formed by performing an exclusive OR operation on both the first keying material and the second keying material.

7. The method of claim 1, wherein authentication of the user is performed through biometrics.

8. The method of claim 1, wherein the second keying material is stored within internal memory of a trusted platform module.

9. The method of claim 1, wherein the second keying material is stored within a section of access-controlled system memory of the platform.

10. The method of claim 1, wherein the identification information includes a serial number of an integrated circuit device employed within the platform.

11. A platform comprising:
    an input/output control hub (ICH);
    a non-volatile memory unit coupled to the ICH, the non-volatile memory unit including an integrity metric including a hash value of an identification information of a platform and a Basic Input/Output System (BIOS) code including a first BIOS area and a second BIOS area, the first BIOS area being a first segment of the BIOS code encrypted with a second keying material and the second BIOS area being a second segment of the BIOS code encrypted with a combination key; and
    a trusted platform module coupled to the ICH, the trusted platform module to produce a combination key during a BIOS boot process by combining a first incoming keying material released after authentication of a user of the platform with the second keying material internally stored within the platform and to decrypt the second BIOS area using the combination key to recover the second segment of BIOS code.

12. The platform of claim 11, wherein the trusted platform module to further decrypt the first BIOS area to recover the first segment of the BIOS code in an non-encrypted format.

13. The platform of claim 11 further comprising a hard disk drive coupled to the ICH.

14. The platform of claim 13, wherein the trusted platform module to further unbind keying material associated with the hard disk drive to access contents stored within the hard disk drive.

15. A program loaded into computer readable memory, including at least one of a non-volatile memory and a volatile memory, for execution by a trusted platform module of a platform, the program comprising:
   code to decrypt a first Basic Input/Output System (BIOS) area of a BIOS code during a BIOS boot process to recover a first segment of BIOS code, the first BIOS area being the first segment of the BIOS code encrypted with a keying material and an integrity metric including a hash value of an identification information of the platform;
   code to produce a combination key during the BIOS boot process by combining a first incoming keying material released after authentication of a user of the platform with a second keying material internally stored within the trusted platform module; and
   code to decrypt a second BIOS area of the BIOS code using the combination key to recover a second segment of the BIOS code during the BIOS boot process, the second BIOS area being the second segment of the BIOS code encrypted with the combination key.

16. The program of claim 15 further comprising:
   code to unbind keying material associated with a non-volatile storage device for accessing contents stored within the non-volatile storage device.

* * * * *